US008290122B2

(12) United States Patent
Allevad et al.

(10) Patent No.: US 8,290,122 B2
(45) Date of Patent: Oct. 16, 2012

(54) METHOD AND DEVICE FOR ESTIMATING PROPERTIES OF A TELECOMMUNICATION TRANSMISSION LINE

(75) Inventors: Stefan Allevad, Stockholm (SE); Per Ödling, Älvsjö (SE); Antoni Fertner, Stockholm (SE); Henrik Back, Vendelsö (SE); Fredrik Lindqvist, Älvsjö (SE); Per Ola Börjesson, Lund (SE); Jaume Rius i Riu, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1045 days.

(21) Appl. No.: 12/091,314

(22) PCT Filed: Oct. 27, 2005

(86) PCT No.: PCT/SE2005/001619
§ 371 (c)(1),
(2), (4) Date: Oct. 6, 2008

(87) PCT Pub. No.: WO2007/050001
PCT Pub. Date: May 3, 2007

(65) Prior Publication Data
US 2009/0213998 A1    Aug. 27, 2009

(51) Int. Cl.
*H04M 1/24* (2006.01)
*H04M 3/08* (2006.01)
*H04M 3/22* (2006.01)

(52) U.S. Cl. .................. 379/29.03; 379/30
(58) Field of Classification Search ............ 379/29.03, 379/30
See application file for complete search history.

(56) References Cited

U.S. PATENT DOCUMENTS

| 6,567,955 | B1 | 5/2003 | Yamaguchi |
| 6,738,440 | B1* | 5/2004 | Isaksson et al. ............ 375/349 |
| 6,909,978 | B2* | 6/2005 | Bostoen et al. ............ 702/65 |
| 2005/0119848 | A1 | 6/2005 | Reichel et al. |
| 2005/0222831 | A1 | 10/2005 | Elfadel |

FOREIGN PATENT DOCUMENTS

| EP | 1248383 A | 10/2002 |
| JP | 2002-027111 | 1/2002 |
| WO | WO 2004/100512 A1 | 11/2004 |

* cited by examiner

*Primary Examiner* — Alexander Jamal (57) ABSTRACT

A method and device for estimating one or more transmission properties of a telecommunication transmission line. At least one signal is sent on the line, the at least one signal including at least two frequencies for which the absolute value of the line propagation constant times the line length is less than $\pi$, and a resulting signal is received. An estimate of at least one transmission line property is then determined by examining the relationship between the sent and resulting signal or signals. The process may be repeated, if necessary. The estimate determination may also be repeated one or more times, with each successive estimate preferably using for the determination only those frequencies for which, as previously estimated, the absolute value of the line propagation constant times the line length is less than $\pi$.

16 Claims, 6 Drawing Sheets

METHOD AND DEVICE FOR ESTIMATING PROPERTIES OF A TELECOMMUNICATION TRANSMISSION LINE

TECHNICAL FIELD OF THE INVENTION

The present invention relates to the field of transmission line analysis.

DESCRIPTION OF RELATED ART

It is of great interest for the operation of telecommunication networks to measure the properties of the transmission lines of the network. The results of such measurements can be used for e.g. detecting faults, locating faults, predicting certain faults which are about to occur, and estimating the suitability and capacity of a line for certain services, such as DSL.

A variety of methods and devices can be used to estimate line properties.

Single-ended line test, SELT is an important way of testing. Here, line properties are estimated from measurements made at one end of the line only.

One class of SELT equipment is dedicated measurement equipment with metallic test access. Here, a special-purpose measurement device is galvanically connected to the transmission line when the measurement is made.

Such measurements can be made in various ways. Capacitance may be estimated by applying a voltage to the line, then removing it and measuring the voltage decay time.

Line length may me measured by sending a pulse and measuring the time until a reflected pulse arrives, so called Time Domain Reflectometry, TDR.

However, galvanic access requires special arrangements. Either it can be achieved by manually connecting to the line to be measured, or the line boards of the telecommunication exchange serving the lines need special hardware (e.g. a relay) to provide the galvanic access when needed. This is a major drawback.

Further, a test device can typically carry out one measurement at a time. Employing many such test devices is costly, and it may be problematic to arrange for galvanic access to several lines by several test devices simultaneously, depending on the character of the arrangement for providing galvanic access.

A more attractive solution is to get test access to lines through the normal signal paths of the line boards of the exchange. Many lines can be accessed simultaneously, and dedicated hardware is not needed.

Existing line boards often have built-in functionality for simple line testing, e.g. measurement of resistance and voltages between the wires of the pair and between each wire and ground. However, the accuracy of such built-in functionality is often low.

Patent application PCT/SE2004/000718 describes a method wherein the length of a transmission line may be determined by analysing the relationship between a sent signal and a received resulting signal.

The relationship is adjusted for the influence of the transceiver on the signals, and a line input impedance as a function of frequency is calculated. Length is then determined from the periodic behaviour of the absolute value of the impedance. The method does not work well for line lengths above about 1.5 km, and uses frequencies approximately in the range from 30 kHz to 1 MHz.

A reflected pulse similar to that of a TDR measurement can be calculated by way of an inverse Fourier transform of the line input impedance, wherein the line impedance is first determined as above. A broadband measurement of the line impedance is required. Line lengths up to about 6.4 km can be measured in this way. Performance details on this method can be found in the document EDA 2.1 Line Testing, EN/LZT 108 7773 R1A, Ericsson AB, March 2005.

SUMMARY OF THE INVENTION

Current methods for estimating properties for telecommunication transmission lines suffer from the drawbacks that they require dedicated hardware or metallic test access, or have low accuracy, or do not work for long lines. Usually, only one or a few line properties can be estimated from a single measurement.

The present invention is concerned with the problem of overcoming these drawbacks when estimating transmission properties of a telecommunication transmission line.

An object of the present invention is to find a method which is not dependent on dedicated hardware or metallic test access, has reasonable accuracy and which works for longer lines and can estimate more properties from a single measurement. A further object is to provide a device and a program product for carrying out the method.

The stated problem is solved by a method wherein a signal is sent on the transmission line, a resulting signal is received and a transmission property estimated from the relationship between the sent and received signals, wherein the sent signal comprises at least two frequencies for which the absolute value of the line propagation constant times the line length is less than $\pi$.

If at the time of measurement it is unknown whether the used frequencies fulfill that criterion, a first estimate may be made using a predetermined set of frequencies. Frequencies for use in a second or in a successive further estimate may then be selected based on the results of the first or a previous estimate.

Somewhat more in detail, properties of a line may (as described above) in general be determined from the relationship between a sent signal and a received resulting signal. It has now been discovered that if the sent signal fulfils a specific criterion, longer lines can be measured than previously possible. Accuracy is reasonable, and several properties can be estimated from a single measurement. If so desired, the line board used for normal operation of the line can be used to send and receive the signals (thus without need for metallic test access). The line board can even be a standard POTS board.

The criterion is that the sent signal (or signals) comprises at least two frequencies for which the absolute value of the line propagation constant times the line length is less than $\pi$. When this criterion is fulfilled, it becomes possible to calculate line properties in a different way from the prior art, which yields better results in important respects.

Even more in detail, the method is carried out as follows. A line input impedance as a function of frequency is determined from the relationship between the sent and received signals. For the frequency range of the criterion, it is possible to use a Taylor series expansion to express the line input impedance in terms of line constants and frequency. After truncation of higher order terms and insertion of measured values, the resulting system of equations can be solved and the line constants generated, provided that there are at least two frequencies. If there are more than two frequencies, the system of equations is over-determined, and a solution is found through least squares adaption. More frequencies generally give better accuracy.

It is thus an advantage of the present invention that the method can be used through the normal signal paths (e.g. speech paths in the case of a POTS board) of a line board for normal operation of a transmission line, and thus no metallic test access is needed.

A further advantage is that it can use the POTS band and can be used through a POTS line board.

An advantage of using a POTS board is that such boards are usually present in telecommunication exchanges.

Another advantage is that if the POTS band is used for measurement (whether through a POTS board or not), it can be carried out without disrupting ongoing DSL traffic.

A further, important advantage is that properties may be estimated for longer lines than previously possible from comparison between a sent and a received resulting signal measured through a line board.

Still an advantage of using the POTS band (i.e. relatively low frequencies)) is that signal attenuation in a transmission line is generally lower for lower frequencies. A low attenuation means that an acceptable strength of the received signal can be achieved for longer lines, that is, longer lines can be measured.

Another advantage is that it has better accuracy than measurement functionality built into prior art POTS boards.

Still an advantage is that more parameters than previously possible may be determined from a single measurement.

A further advantage is that many measurements may take place simultaneously, without incurring high costs. Large volumes of measurements may be scheduled and take place automatically on a routine basis.

Another advantage is that line boards may be made cheaper if the relay that provides galvanic line access to dedicated test equipment is no longer needed.

Yet an advantage is that the calculations involved in the method according to the invention are not numerically demanding, and may be implemented with low computing power.

DETAILED DESCRIPTION OF EMBODIMENTS

Figure 1:
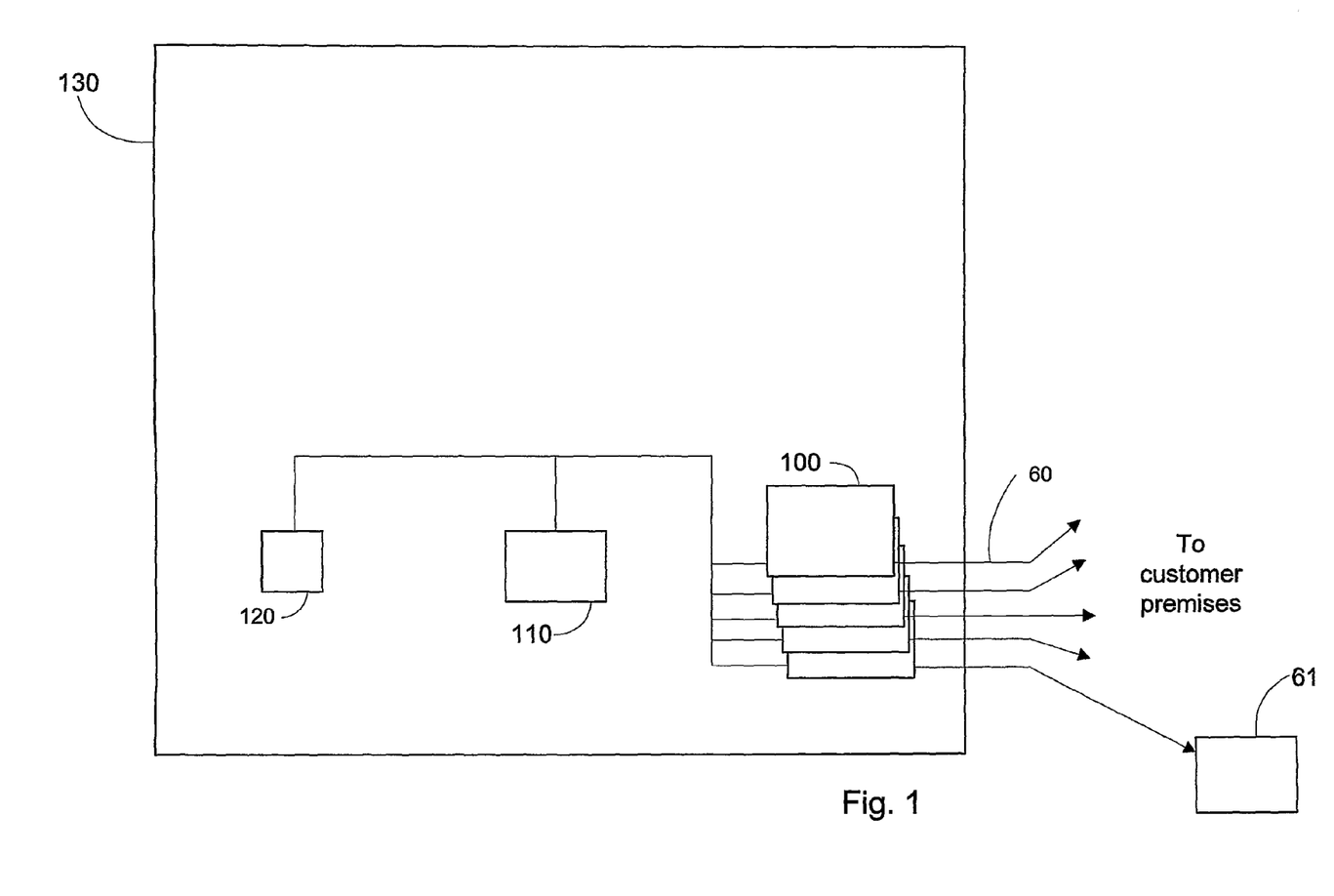
FIG. 1 shows a block schematic of a simplified central office setting.

With reference to FIG. 1, telecommunication transmission lines 60 typically terminate in one end at a customer premises site 61 and in the other end at a central office setting 130. Here, the lines are typically connected to line boards 100. The line boards 100 are typically controlled by a processor 110 of a telecommunication exchange. It is of great interest to be able to measure properties of the lines 60 from the central office setting 130.

The initial steps of the present method are to send a signal on a transmission line 60 and receive a resulting signal. From the relationship between the signals, a complex line input impedance can then be calculated for each of a number of frequencies present in the signals. From that impedance, other transmission properties of the line may be determined.

Here will be described how to practice the method when the signals are sent and received through a line board 100 and when the line board is a POTS line board.

Figure 2:
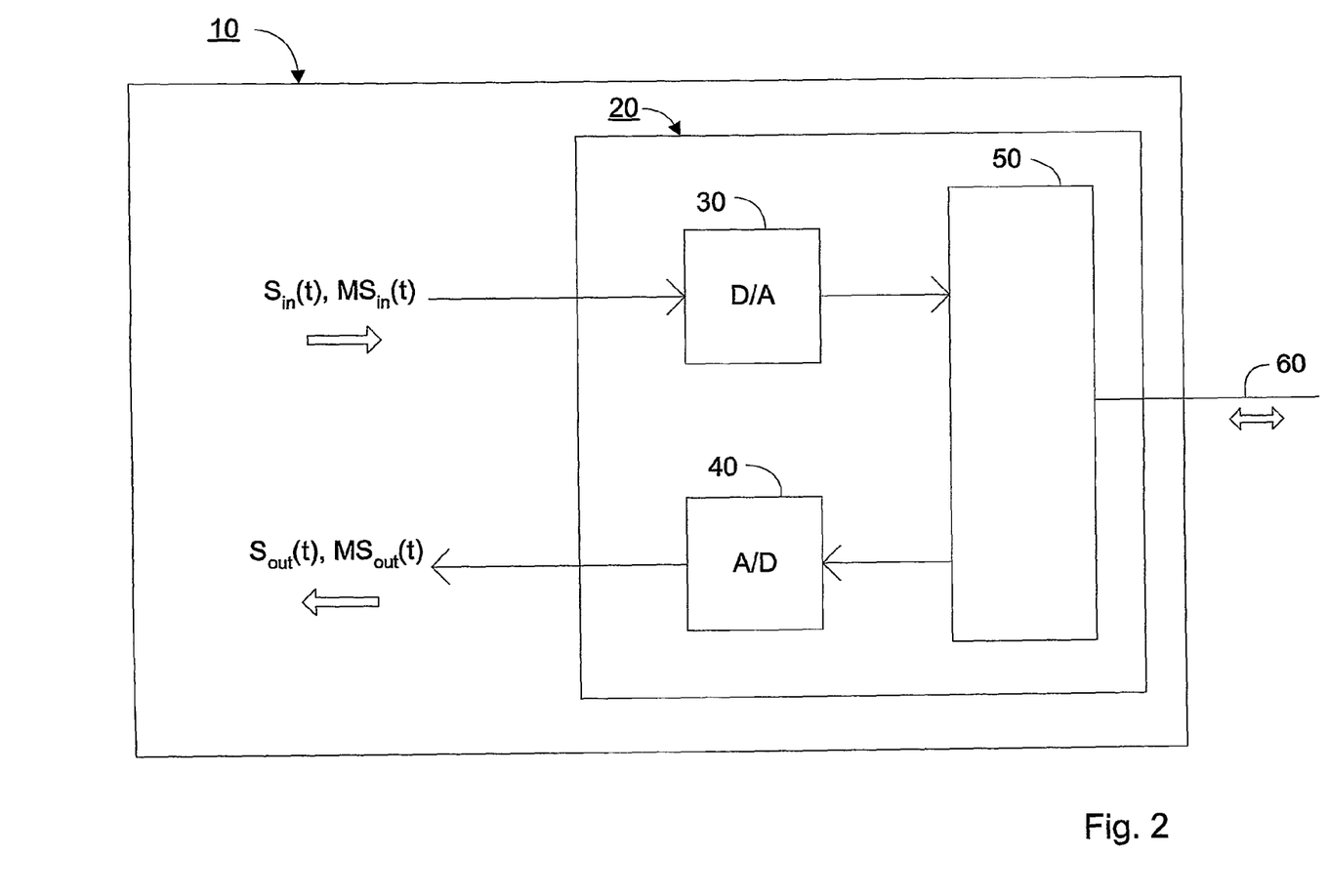
FIGS. 2 and 3 show a block schematic of a simplified structure of a POTS lineboard.

Somewhat simplified, a POTS lineboard 10 has a structure according to FIG. 2. A transmission line 60 is connected to an analog front-end 50 which is connected to digital to analog (D/A) and analog to digital (A/D) converters 30 and 40.

The analog front-end comprises amplifiers and other analog circuitry such as a line transformer and hybrid circuitry for separating sent and received signals.

The A/D and D/A converters together with the analog front-end make up the transceiver 20.

A signal $S_{in}(t)$ that is to be sent on the line 60 is supplied in digital form to the transceiver 20 where, in the D/A converter 30, it is converted to an analog voltage which is sent on the line through the analog front-end 50. An incoming signal is received from the line through the analog front-end by the A/D converter 40 which converts it to a digital signal and outputs it from the transceiver as signal $S_{out}(t)$.

For measurement purposes, a measurement signal $MS_{in}(t)$ in digital form may be supplied to the transceiver and then sent on the transmission line. A resulting signal will be received from the line and supplied in digital form by the transceiver as signal $MS_{out}(t)$.

The digital signals $MS_{in}(t)$ and $MS_{out}(t)$ are normally expressed in the time domain. They can be converted into a frequency domain representation by a conventional FFT transform, wherein the signal $MS_{in}(t)$ is transformed to a signal $V_{in}(f)$ and the signal $MS_{out}(t)$ is transformed to a signal $V_{out}(f)$.

The relationship between the sent and received signals as a function of frequency is called the echo transfer function, $H_{echo}(f)$. It is defined as $$H_{echo}(f) = V_{out}(f)/V_{in}(f)$$

The echo transfer function $H_{echo}(f)$ is complex valued and depends both on the characteristics of the line and on the characteristics of the transceiver. The signals $V_{in}(f)$ and $V_{out}(f)$ are the complex valued Fourier transforms of the sent and received signals.

Hence, to determine a line input impedance $Z_{in}(f)$ from the echo transfer function $H_{echo}(f)$, the characteristics of the transceiver 20 must be considered.

The influence of the transceiver may be, for the purposes of the method, characterised by three calibration parameters, $Z_{ho}(f)$, $Z_{hyb}(f)$ and $H_\infty(f)$. They are all complex valued and frequency dependent.

The parameter $H_\infty(f)$ is the frequency dependent echo transfer function for the transceiver with an open line connection, i.e. no line connected. The parameter $Z_{hyb}(f)$ is the impedance of the transceiver as measured at the line connections of the line board, i.e. the impedance of the board as seen from the line. The parameter $Z_{ho}(f)$ can be expressed as $Z_{ho}(f) = H_0(f) \cdot Z_{hyb}(f)$ in which a parameter $H_0(f)$ is the complex and frequency dependent echo transfer function for the transceiver with the line connections short-cut, and the parameter $Z_{hyb}(f)$ is defined as above.

Figure 3:
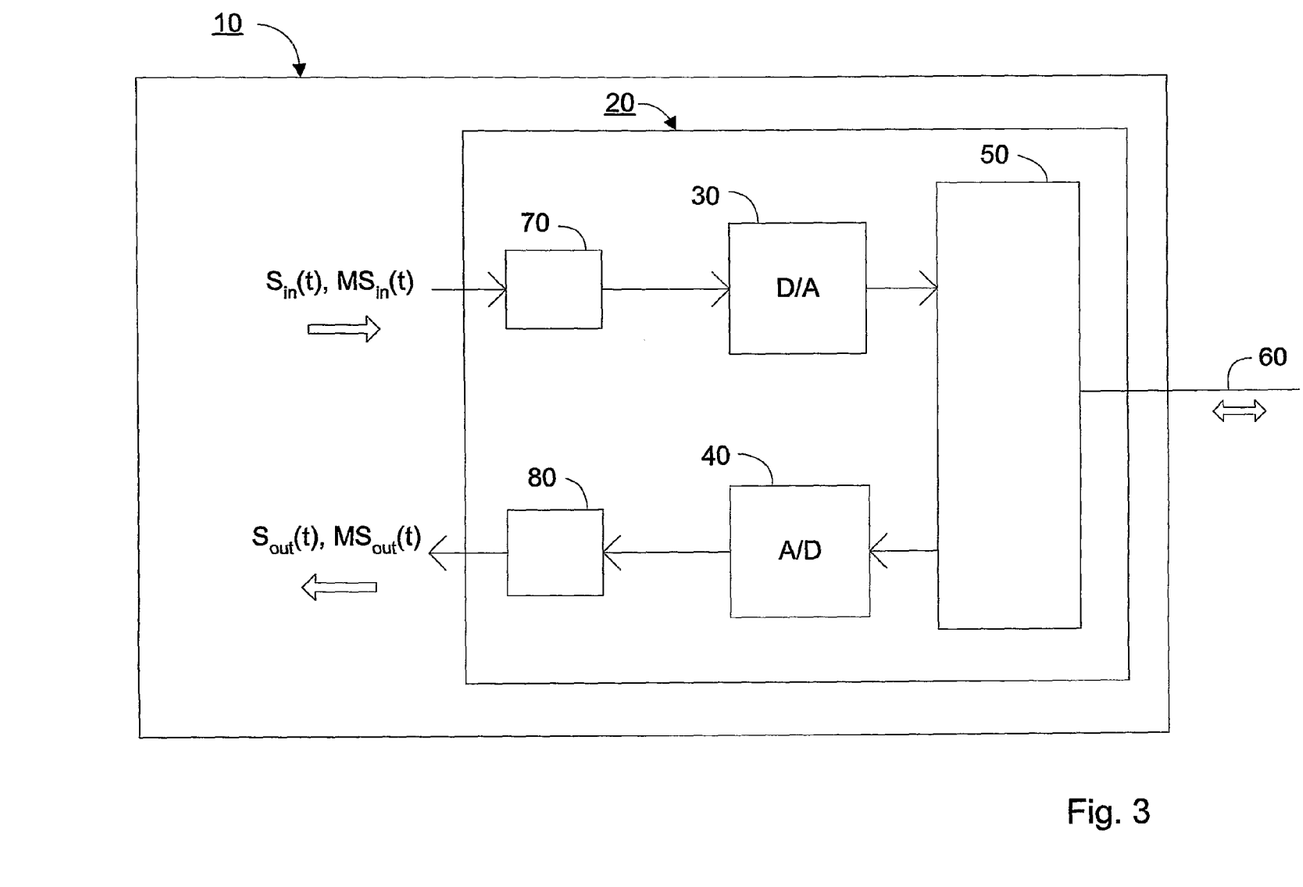

In addition to circuitry of the analog front-end 50, the transceiver 20 may also provide digital filtering of signals in digital filters 70 and 80 as shown in FIG. 3. A signal to be sent is then subjected to digital filtering by the line board before it is sent and the received resulting signal is subjected to digital filtering after it has been converted by the A/D converter 40. For the purposes of the method, such filters may be inactivated, or they may be kept active. In the latter case, the effect of digital filtering on the signals may of course be included when determining the values of the calibration parameters to compensate for the influence of the filters on the signals.

The signals $MS_{in}(t)$ and $MS_{out}(t)$ (as well as $V_{in}(f)$ and $V_{out}(f)$) then refer to the sent signal before filtering and to the received signal after filtering, respectively, as shown in FIG. 3.

How to determine and use the calibration parameters $Z_{ho}(f)$, $Z_{hyb}(f)$ and $H_\infty(f)$ is described in further detail in patent applications PCT/SE2004/000296, PCT/SE2004/000566 and PCT/SE2004/000718 (published as WO2004/100512, WO2004/100513 and WO2004/099711).

The complex valued frequency dependent input impedance of the transmission line, as seen from the interface of the line board can be calculated as $$Z_{in}(f) = (Z_{ho}(f) - Z_{hyb}(f) \cdot H_{echo}(f)) / (H_{echo}(f) - H_\infty(f))$$

where $$H_{echo}(f) = V_{out}(f)/V_{in}(f)$$

Thus, when the signal $V_{in}(f)$ has been sent and the signal $V_{out}(f)$ has been received, the line input impedance can be determined as above.

It has been described above that a voltage is applied and a received resulting voltage is measured. However, in principle one or both signals could be currents, as long as the line input impedance can be calculated from the relationship between the signals.

At least two frequencies fulfilling the convergence criterion explained below are required to be present. More frequencies generally give better accuracy. It is of course possible to send and receive several signals, where the signals together comprise the required number of frequencies, provided that it is possible to determine the line input impedance.

The signals may be sent and received by dedicated measurement equipment, or through the normal signal paths of a line board to which the line is connected. The line board may be a POTS line board as described above, or some other type.

Depending on the type of signals and the equipment used, the formula for determining the line input impedance may be different from that described above.

Determining Line Constants From the Input Impedance

A transmission line can be described by per-unit-length parameters: a series resistance R, a series inductance L, a shunt conductance G, and a shunt capacitance C (e.g in the denominations Ω/km, H/km, S/km and F/km respectively). These are called primary parameters of the cable type.

For the frequencies used for the present invention, the primary parameters can be assumed to be reasonably constant and independent of frequency.

The propagation constant γ, and characteristic impedance $Z_0$ are defined in terms of the primary parameters: R, L, G and C, i.e. $\gamma = \sqrt{(R+j\omega L)\cdot(G+j\omega C)}$ and $Z_0 = \sqrt{(R+j\omega L)/(G+j\omega C)}$ respectively.

For an open-ended transmission line of length d, input impedance can be expressed as $$Z_{in} = Z_0 \coth(\gamma d)$$

Using the Taylor series expansion of γd coth(γd), and after some manipulations, the input impedance can be expressed as $$Z_{in} = \frac{1}{\hat{G}+j\omega\hat{C}} + \frac{\hat{R}}{3}\left(1 - \frac{\hat{R}\hat{G}}{15}\right) + j\omega\left(\frac{\hat{L}}{3} - \frac{\hat{R}^2\hat{C}}{45} - \frac{2\hat{R}\hat{G}\hat{L}}{45}\right) - \frac{2}{45}\left\{\hat{R}\hat{C}\cdot\left(\hat{L} - \frac{\hat{R}^2\hat{C}}{21}\right) + \frac{\hat{G}\hat{L}^2}{2}\right\}(j\omega)^2 + KO(j\omega)^3$$

where $\hat{R} = R*d$, $\hat{L} = L*d$, $\hat{G} = G*d$, $\hat{C} = C*d$, $\omega = 2\pi f$ and $f$ denotes frequency. The values $\hat{R}, \hat{L}, \hat{G}$ and $\hat{C}$ are called line constants. The series expansion is valid (convergent) for $|\gamma d| < \pi$.

In practice, the shunt conductance of the transmission line can be neglected (G=0). Likewise, higher terms except the first three or at most four terms are insignificantly small. This allows expressing $Z_{in}$ as a pure polynomial:

$$Z_{in}(j\omega) = \sum_{k=-1}^{2} a_k \cdot (j\omega)^k$$

where the coefficients $\alpha_k$ can be explicitly bound to the line constants, i.e.

$$a_{-1} = \frac{1}{\hat{C}}; \quad a_0 = \frac{\hat{R}}{3}; \quad a_1 = \frac{1}{3}\left(\hat{L} - \frac{\hat{R}^2\hat{C}}{15}\right); \quad a_2 = -\frac{2\hat{R}\hat{C}}{45}\left(\hat{L} - \frac{\hat{R}^2\hat{C}}{21}\right)$$

Representing line input impedance as a frequency polynomial reduces evaluation of the line constants of the subscriber line to solving normal equations. The square error function can be introduced as $$\varepsilon^2 = \left\{\sum_{m=1}^{N}\left|Z_{in}(j\omega_m) - \sum_{k=-1}^{2} a_k \cdot (j\omega_m)^k\right|^2\right\}$$

where $Z_{in}(j\omega_m)$ is a spectral component of the measured $Z_{in}$ which is used for the estimate and N is the total number of spectral components (frequencies) used for the estimate.

Solving for the coefficients $\alpha_{-1}$ through $\alpha_2$ (e.g. the common least-squares approach of finding the set of coefficients that give the minimum $\epsilon^2$) leads to minimum variance estimates of the line constants $\hat{R}, \hat{L}$ and $\hat{C}$.

In the following, we consider the real and imaginary part of the above equation separately, i.e.

$$\varepsilon^2 = \left\{\sum_{m=1}^{N}\left[\text{Re}(Z_{in}(j\omega_m)) - \text{Re}\left(\sum_{n=0}^{1} a_{2n} \cdot (j\omega_m)^{2n}\right)\right]^2\right\} + \left\{\sum_{m=1}^{N}\left[\text{Im}(Z_{in}(j\omega_m)) - \text{Im}\left(\sum_{n=0}^{1} a_{2n-1} \cdot (j\omega_m)^{2n-1}\right)\right]^2\right\}$$

The normal equations can be solved in the frequency domain for the real and imaginary parts separately since the even coefficients are exclusively associated with the real part whereas the odd coefficients are associated with the imaginary part. Only two spectral components (frequencies) of the line input impedance Zin are required in order to solve for the four coefficients $\alpha_k$. More frequencies will generally give better accuracy.

When the coefficients $\alpha_k$ have been determined, line constants $\hat{R}$, $\hat{L}$ and $\hat{C}$ can be determined as follows:

$$\hat{C} = \frac{1}{a_{-1}}$$

$$\hat{R} = 3a_0$$

$$\hat{L} = 3a_1 + \frac{\hat{R}^2 \hat{C}}{15}$$

or alternatively $$\hat{L} = \frac{\hat{R}^2 \hat{C}}{21} - \frac{45 a_2}{2\hat{R}\hat{C}}$$

From experience, determining $\hat{L}$ from $\alpha_1$ rather than from $\alpha_2$ is generally the better choice in terms of accuracy.

Determining Line Length

When the line capacitance, $\hat{C}$ is known, line length d is estimated by way of a known or likely value of C (capacitance per unit of length), e.g. 50 nF/km.

$$d = \frac{\hat{C}}{C}$$

Choice of Frequencies

Figure 4:
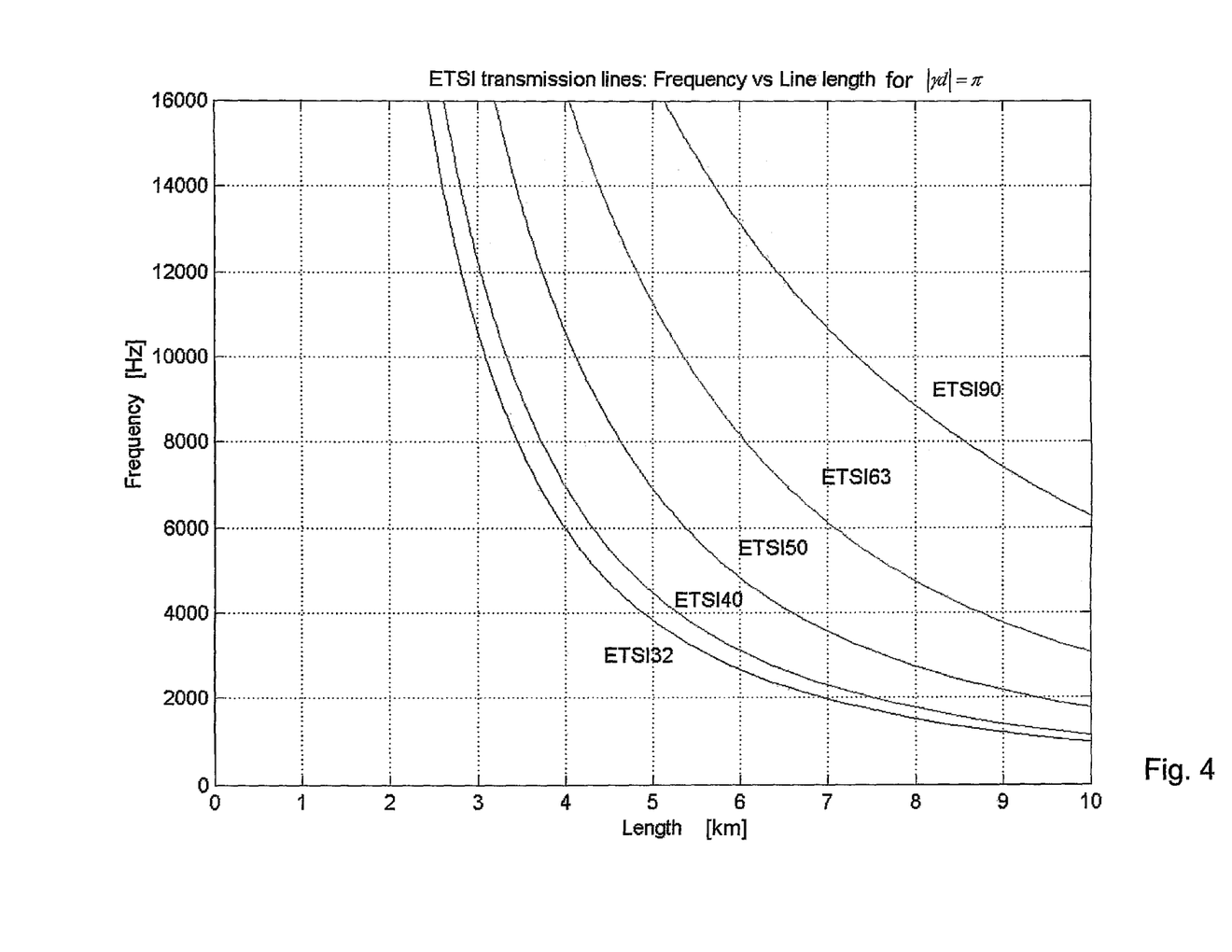
FIG. 4 shows a diagram of frequency as a function of cable length for the condition that the absolute value of the propagation constant times line length equals π, for various ETSI cable types.

The Taylor series expansion used in the expression of the line input impedance is valid for $|\gamma d| < \pi$ (radius of convergence). Hence, frequencies should be chosen such that $|\gamma d| < \pi$. This is illustrated in FIG. 4 showing plots of $|\gamma d| = \pi$ for various ETSI cables. The area below and to the left of the curve for a specific cable type is the area in which the convergence criterion is fulfilled for that cable in terms of cable length and frequency.

The choice of frequencies for the measurement signal is thus dependent on the length and primary parameters of the transmission line, which may be unknown. To solve that problem, a wide range of frequencies can first be used to determine a rough estimate of length and line constants. A more accurate estimate is then made, using frequencies which fulfill the convergence criterion.

This may be made in the following, successive fashion. A first estimate is made using many frequencies. From the thus obtained estimates of $\hat{R}$, $\hat{L}$, $\hat{G}$ and $\hat{C}$, (where $\hat{G}$ may be neglected, i.e. assumed equal to zero) it may be determined which of the used frequencies fulfill the convergence criterion $|\gamma d| < \pi$, where, for each frequency, $\gamma d = \sqrt{(\hat{R}+j\omega\hat{L})\cdot(\hat{G}+j\omega\hat{C})}$. (Thus, fulfillment of the convergence criterion can be evaluated directly from the line constants, without first making a length estimate.)

Those frequencies which do not fulfill the convergence criterion are removed and the calculation is repeated. Again, those frequencies which according to the new estimate do not fulfill the convergence criterion are removed from the calculation. The process is repeated until a set of frequencies remain for which the estimates of the line constants indicate that the convergence criterion is fulfilled for all the frequencies used for the estimate.

It is also possible to start estimating from only a few, low frequencies and successively add higher frequencies to the estimate until the estimate indicates that the next frequency to be added will not fulfill the convergence criterion. E.g. the first estimate could be based on tones 3 and 4 (as defined below) and successively higher tones then be added.

Accuracy will generally be improved for each tone added, mainly due to reduced influence of noise. However, the third tone will generally contribute most to increased accuracy and successive tones will contribute less. Hence, an estimate based on three frequencies is the optimum in some implementations.

In one implementation of the invention, the following simple rules have been used. A number of frequencies, starting at 125 Hz and with 125 Hz spacing up to 3625 Hz are defined as tones 1-29.

A first rough estimate is made using all tones. Then,
    for cables estimated being longer than 4 km tones 1-14 (125-1750 Hz) are used,
    for cables estimated being shorter than 3 km tones 14-29 (1750-3625 Hz) are used,
    otherwise tones 1-25 (125-3125 Hz) are used.

In another implementation, a first rough estimate is made using all tones and then
    for cables estimated being longer than 6 km tones 3-13 (375-1625 Hz) are used
    for cables estimated being shorter than 3 km tones 6-26 (750-3250 Hz) are used
    otherwise tones 3-15 (375-1875 Hz) are used.

Other factors which may be considered when choosing frequencies are frequency dependent noise (noisy frequencies may be avoided) and the fact that at very low frequencies conductance G cannot be neglected for all types of cables (very low frequencies may be avoided)

E.g. to avoid low frequencies, one might use frequencies greater than or equal to 125 Hz or greater than or equal to 375 Hz for example.

Further, when not using dedicated measurement equipment, it may be impossible to use DC signals (for example when sending signals through most line boards), which in that case would impose the restriction that frequency be greater than zero.

Achieved Accuracy And Reach

The estimation of $\hat{R}$, $\hat{L}$ and $\hat{C}$ have been tested with cable simulators and on real cables on cable drums, as well as actual transmission lines in the field.

In general, for cables up to 9 km length, $\hat{C}$ and $\hat{R}$ can be estimated with an accuracy of about 2-6%. Cables up to 11 km have been measured with errors of approximately 15-20%. The accuracy of the length estimate is the same as the error in $\hat{C}$ plus any error introduced by an erroneous value for the capacitance per km.

The estimation of $\hat{L}$ usually has a considerably lower accuracy, frequently on the order of 30%.

Estimating the Terminating Impedance Type

Figure 5:
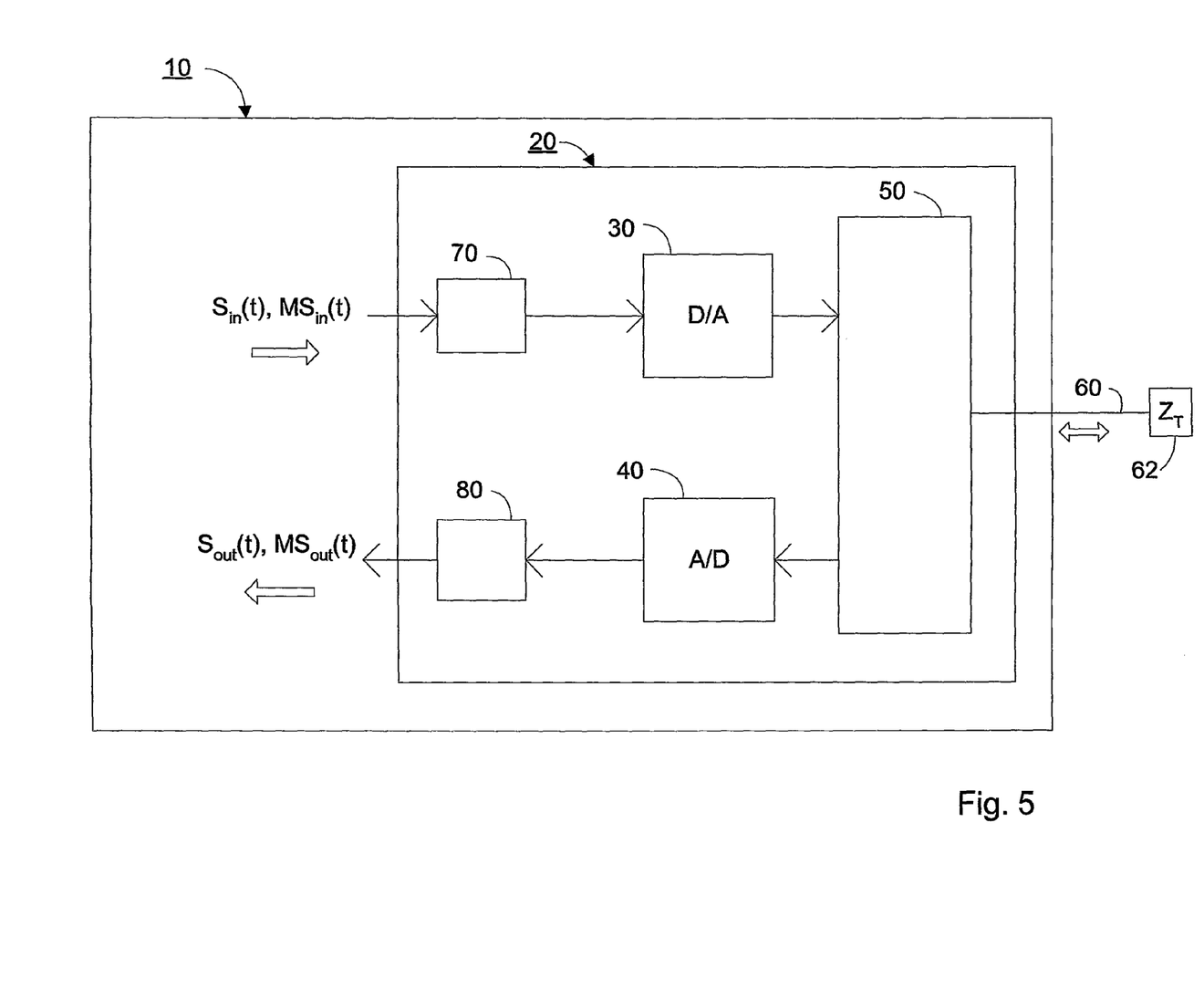
FIG. 5 shows a simplified block schematic of a POTS lineboard, a transmission line and a terminating impedance.

Above, it has been assumed that the line end is open, or that the terminating impedance is such that the line conditions are substantially equivalent to an open-ended line. When the line end is not open, but instead as shown in FIG. 5 a terminating impedance 62 is connected, the type of terminating impedance may be estimated.

The input impedance of a transmission line, one end of which is terminated with an impedance $Z_T$ can be expressed as $$Z_{in} = Z_0 \frac{Z_T \cdot \cosh(\gamma d) + Z_0 \cdot \sinh(\gamma d)}{Z_T \cdot \sinh(\gamma d) + Z_0 \cdot \cosh(\gamma d)}$$

Neglecting G (G=0), it can be expanded in series of the variable $j\omega$ $$Z_{in} = \hat{R} + Z_T + (j\omega)^1 \cdot \left(\hat{L} - \frac{1}{3}\hat{R}^2\hat{C} - Z_T^2\hat{C} - Z_T\hat{R}\hat{C}\right) + +(j\omega)^2 \cdot$$

$$\left(\frac{2}{15}\hat{R}^3\hat{C}^2 - \hat{L}\hat{C}Z_T + \frac{4}{3}\hat{R}\hat{C}^2 Z_T^2 + \frac{2}{3}\hat{R}^2\hat{C}^2 Z_T + \hat{C}^2 Z_T^3 - \frac{2}{3}\hat{R}\hat{C}\hat{L}\right) + +$$

$$(j\omega)^3 \cdot \left(-\frac{17}{315}\hat{R}^4\hat{C}^3 - \frac{5}{3}\hat{R}\hat{C}^3 Z_T^3 - \frac{17}{45}\hat{R}^3\hat{C}^3 Z_T + \frac{4}{3}\hat{C}^2 Z_T^2 \hat{L} +\right.$$

$$\left.\frac{4}{3}\hat{R}\hat{C}^2 Z_T \hat{L} + -\frac{17}{15}\hat{R}^2\hat{C}^3 Z_T^2 - \hat{C}^3 Z_T^4 + \frac{2}{5}\hat{R}^2\hat{C}^2 \hat{L} - \frac{1}{3}\hat{C}\hat{L}^2\right) + K$$

The series is valid (convergent) for $|\gamma d| < \pi$.

The load impedance $Z_T$ may have both a resistive and a reactive part, i.e. $Z_T = R_T + jX_T$. For most practically occurring values of R and C, and for the frequencies used for the present invention, a series R–C termination can be approximated as a capacitive termination, $$Z_T = R_T + \frac{1}{j\omega C_T} \cong \frac{1}{j\omega C_T},$$

whereas a parallel R–C termination can be approximated as a resistive termination, $$Z_T = \frac{R_T}{1 + j\omega R C_T} \cong R_T.$$

Comparison of the series expansion of the input impedance for the short-circuited transmission line, ($Z_T=0$)

$$Z_{in} = \hat{R} + \left\{\hat{L} - \frac{\hat{R}^2 \hat{C}}{3}\right\}(j\omega)^1 + O((j\omega)^{3/2})$$

with the series expansion for the open-ended transmission line ($Z_T=\infty$)

$$Z_{in} = \frac{1}{\hat{C}}(j\omega)^{-1} + \frac{\hat{R}}{3}(j\omega)^0 + O((j\omega)^{3/2})$$

shows that the imaginary part of the input impedance varies approximately as $$\frac{1}{\omega}$$

or $\omega$ depending on whether line is open-ended/capacitive terminated or short-circuited/resistively terminated.

Hence, the imaginary part as a function of frequency may be used to distinguish between an open-ended/capacitive-terminated or short-circuited/resistive-terminated line. The absolute value of the imaginary part at a very low frequency (e.g. 125 Hz) is compared with the absolute value of the imaginary part at a frequency of about 1 to 2 kHz. If the absolute value of the imaginary part at the low frequency is greater than the absolute value at the higher frequency, then the line is most likely open-ended or capacitive-terminated. If the absolute value of the imaginary part at the low frequency is lower, then the line is most likely short-circuited or resistive-terminated.

Flow Chart Depiction of the Method

The method described above is shown in the flowchart of FIG. 6. It starts in a step 200 wherein the signal $MS_{in}(t)$ is sent on the transmission line. In a step 201 the resulting signal $MS_{out}(t)$ is received. In a step 202 the sent and received signals are converted into the frequency domain by means of FFT transformation. From the so transformed signals, the echo transfer function $H_{echo}$ is calculated in a step 203. In a step 204, the line input impedance $Z_{in}(f)$ is calculated from $H_{echo}$ and the calibration parameters $Z_{ho}(f)$, $Z_{hyb}(f)$ and $H_\infty(f)$. In a step 205, the coefficients $a_{-1}$–$a_2$ which minimize the square error function $\epsilon^2$ are found by solving the corresponding normal equations. In a step 206 the line constants $\hat{R}$, $\hat{L}$ and $\hat{C}$ are calculated from the coefficients $a_{-1}$–$a_2$. In a step 207 the line length is calculated from the line capacitance $\hat{C}$.

Figure 6:
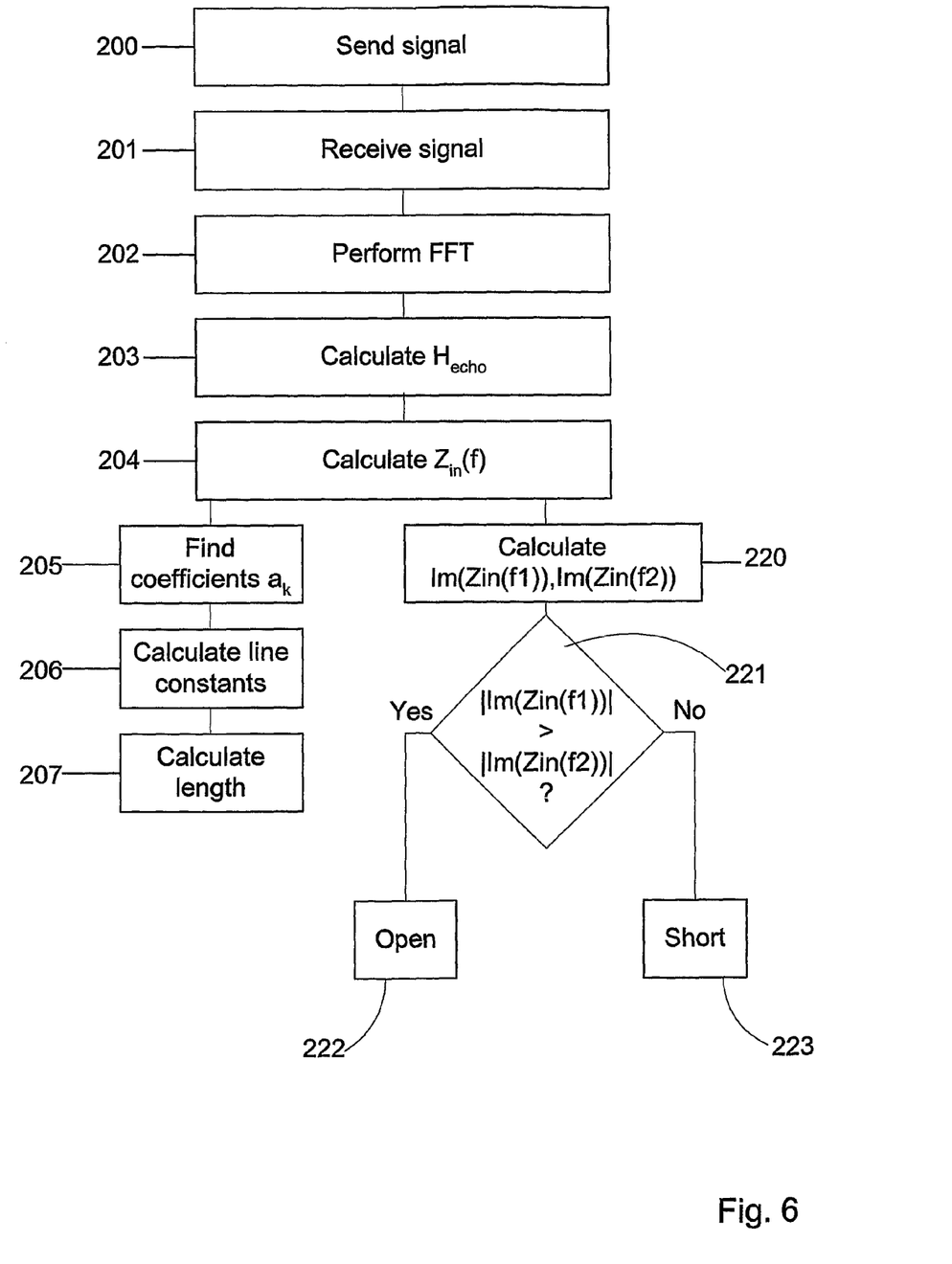
FIG. 6 shows a flowchart of a method for determining transmission properties of a telecommunication transmission line.

In a step 220, the imaginary part of $Z_{in}$ is calculated for a very low (f1, for example 125 Hz) and a higher (f2, for example 1.5 kHz) frequency. In a step 221, it is checked whether the absolute value of the imaginary part of $Z_{in}(f)$ for the very low frequency f1 is greater than the absolute value of the imaginary part of $Z_{in}(f)$ for the higher frequency f2. If the answer is yes, the line end is likely open or capacitive-terminated, step 222. If the answer is no, the line end is likely short-circuited or resistive-terminated, step 223.

Devices And Arrangements For Carrying Out the Method

The method of the invention may be carried out in a setup according to FIG. 1. The sending and receiving of signals on the transmission lines is carried out by the line boards 100, whereas the further processing of the signals is done in a separate workstation 120. Line boards may have a standard function for sending a signal on the transmission line and receiving a resulting signal, which may be used for the purpose of the present invention. A digital representation of the signal to be sent is downloaded from the workstation 120 to the line board. Upon command from the workstation to the line board, the signal is sent on the transmission line 60 and a resulting signal is received, which is then sent back to the workstation. In the workstation, estimates according to the method are then made.

The workstation 120 may handle line tests according to the method for several thousand lines. Tests may be scheduled and carried out on a routine basis to monitor any changes in line properties over time. Comparison with previous results for a particular line may give an indication that a fault has occurred, is about to occur, or that some line property is gradually degrading. Such indications may be detected automatically and give rise to alarms.

Naturally, the functions of the workstation could be distributed on several computers, or reside on the same computer together with other functionality. The workstation or the computers could also be located at another site than the central office setting 130 and communicate via a network.

In a particular implementation, such other functionality is the general management of line boards for DSL. In another implementation, such other functionality is related to other management of the transmission lines, so that all or most functionality regarding transmission line management is carried out in one place. Such a workstation may be called a "Copper Plant Manager".

As an alternative, the method of the invention may be implemented fully in a dedicated test device, or in a line board (which may or may not be a POTS line board). It is also possible that some part of the method is carried out by a line board (in addition to the sending and receiving of signals), and the rest is carried out by the processor 110 of a telecommunication exchange to which the line board belongs. In a further alternative, the method is carried out partly in a line board, in a processor of a said telecommunication exchange and in a separate workstation.

The invention claimed is:

1. A method for estimating at least one transmission property of a telecommunication transmission line, the method comprising the steps of:
   sending at least one signal to the line;
   receiving at least one resulting signal from the line; and
   determining a first estimate of the at least one transmission line property from the relationship between the at least one sent signal and the at least one resulting signal;
   wherein the at least one sent signal comprises at least two frequencies for which the absolute value of the line propagation constant times the line length is less than $\pi$.

2. The method according to claim 1 wherein the at least one transmission property to be estimated is one or more of line length, line resistance, line capacitance, line inductance or line termination impedance-type.

3. The method according to claim 1 wherein the at least one sent signal comprises at least three frequencies for which the absolute value of the line propagation constant times the line length is less than $\pi$.

4. The method according to claim 1 wherein a second estimate is determined using only those frequencies of the first estimate for which, according to the first estimate, the absolute value of the line propagation constant times the line length is less than $\pi$.

5. The method according to claim 4 wherein frequencies used for a the second estimate are selected in dependence of at least one of the line length or the capacitance determined from a previous estimate.

6. The method according to claim 1 wherein the at least two frequencies are within the POTS band.

7. The method according to claim 3 wherein the at least three frequencies are within the POTS band.

8. The method according to claim 1 wherein the at least one sent signal is sent and received through a transceiver that is also used for normal operation of the transmission line.

9. The method according to claim 8 wherein the transceiver is a POTS transceiver.

10. The method according to claim 8 wherein the relationship between the sent and received signals is adjusted to compensate for influence of the transceiver on the signals.

11. The method according to claim 1, wherein the transmission line is longer than about 6.4 km.

12. A device for estimating at least one transmission property of a telecommunication transmission line, the device comprising:
   means for sending at least one signal to the line;
   means for receiving a resulting signal from the line; and
   means for determining an estimate of the at least one transmission line property from the relationship between the at least one sent signal and the at least one resulting signal;
   wherein the at least one signal comprises at least two frequencies for which the absolute value of the line propagation constant times the line length is less than $\pi$.

13. The device according to claim 12 wherein the device is a line board of a telecommunication exchange.

14. A telecommunication exchange for estimating at least one transmission property of a telecommunication transmission line, the telecommunication exchange comprising:
   means for sending at least one signal to the line;
   means for receiving a resulting signal from the line; and
   means for determining an estimate of at least one transmission line property from the relationship between the at least one sent signal and the at least one resulting signal;
   wherein the at least one sent signal comprises at least two frequencies for which the absolute value of the line propagation constant times the line length is less than $\pi$.

15. The method according to claim 1 wherein successive further estimates are determined in the same way until the absolute value of the line propagation constant times the line length is less than $\pi$ for the frequencies used according to an estimate based on those frequencies.

16. A computer program loaded on an internal memory of an exchange in a communications system, comprising software code portions for performing the following steps when the computer program is run on a processor of the exchange:
   sending at least one signal to the line;
   receiving at least one resulting signal from the line; and
   determining an estimate of at least one transmission line property from the relationship between the at least one sent signal and the at least one resulting signal;
   wherein the at least one sent signal comprises at least two frequencies for which the absolute value of the line propagation constant times the line length is less than $\pi$.

* * * * *

UNITED STATES PATENT AND TRADEMARK OFFICE
CERTIFICATE OF CORRECTION

PATENT NO. : 8,290,122 B2
APPLICATION NO. : 12/091314
DATED : October 16, 2012
INVENTOR(S) : Allevad et al.

It is certified that error appears in the above-identified patent and that said Letters Patent is hereby corrected as shown below:

In Column 1, Line 30, delete "me" and insert -- be --, therefor.

In Column 3, Line 18, delete "frequencies))" and insert -- frequencies) --, therefor.

In Column 5, Line 60, delete " $\gamma=\sqrt{(R+j\omega L)\cdot(G+j\omega C)}$ " and insert -- $\gamma = \sqrt{(R+j\omega L)\cdot(G+j\omega C)}$ --, therefor.

In Column 6, Line 23, delete "$\alpha_k$" and insert -- $a_k$ --, therefor.

In Column 6, Line 44, delete "$\alpha_{-1}$," and insert -- $a_{-1}$, --, therefor.

In Column 6, Line 44, delete "$\alpha_2$" and insert -- $a_2$ --, therefor.

In Column 6, Line 66, delete "$\alpha_k$." and insert -- $a_k$. --, therefor.

In Column 7, Line 1, delete "$\alpha_k$" and insert -- $a_k$ --, therefor.

In Column 7, Line 20, delete "$\alpha_1$" and insert -- $a_1$ --, therefor.

In Column 7, Line 21, delete "$\alpha_2$" and insert -- $a_2$ --, therefor.

In Column 7, Line 37, delete "$|\gamma\gamma d|<\pi$" and insert -- $|\gamma d|<\pi$ --, therefor.

In Column 8, Line 36, delete "avoided)" and insert -- avoided). --, therefor.

In Column 11, Line 47, in Claim 5, after "for" delete "a".

Signed and Sealed this
Twenty-sixth Day of February, 2013

Teresa Stanek Rea
*Acting Director of the United States Patent and Trademark Office*